United States Patent [19]

Stewart

[11] 4,313,677
[45] Feb. 2, 1982

[54] NEGHOLD ASSEMBLY FOR PHOTOGRAPHIC PRINTER

[75] Inventor: James F. Stewart, Shoreview, Minn.

[73] Assignee: Pako Corporation, Minneapolis, Minn.

[21] Appl. No.: 126,871

[22] Filed: Mar. 3, 1980

[51] Int. Cl.³ .................. G03B 27/62; G03B 27/64
[52] U.S. Cl. ........................................ 355/76; 352/72
[58] Field of Search ........................... 355/75, 76, 50; 352/224, 226, 72

[56] References Cited

U.S. PATENT DOCUMENTS

| | | | |
|---|---|---|---|
| 3,073,214 | 1/1963 | Haviland | 355/75 |
| 4,161,365 | 7/1979 | Anderson et al. | 355/75 |
| 4,168,114 | 9/1979 | Lopata | 352/224 X |

*Primary Examiner*—Richard A. Wintercorn

*Attorney, Agent, or Firm*—Kinney, Lange, Braddock, Westman and Fairbairn

[57] ABSTRACT

A neghold assembly for use in a photographic printer includes a bottom clamping surface, a pivot arm, a top clamping plate fixedly attached to the pivot arm, a solenoid upwardly engaging the pivot arm and a bias spring for upwardly engaging the pivot arm. The bottom and top clamping plates have apertures that allow light to be transmitted through the photographic film being held between the top clamping plate and the bottom clamping surface for exposing photosensitive print film. The solenoid engages the pivot arm on the side opposite of the pivot point from the top clamping plate. The solenoid pivots the top clamping plate about the pivot point to a clamping position whereby the top and bottom clamping plates are clamped together to hold the film negative. The bias spring pivots the top clamping plate upwardly from the clamping position to an open position when the solenoid is deenergized.

10 Claims, 4 Drawing Figures

NEGHOLD ASSEMBLY FOR PHOTOGRAPHIC PRINTER

BACKGROUND OF THE INVENTION

1. Field of the Invention

The present invention relates to neghold assemblies for use in photographic printers. In particular, the present invention relates to neghold assemblies that automatically clamp and release film negatives in photographic printers.

2. Description of the Prior Art

One critical component of a photographic printer is the neghold assembly, which holds the photographic film negatives at a print gate where high intensity light is passed through the film negative and imaged onto photosensitive print paper.

The neghold assembly must flatten the film and hold the film securely in position during printing. The film must be as flat as possible so that the entire image within the film is in focus on the photosensitive print paper.

Automatic high speed photographic printers have been developed for first-run production printing in which strips of twelve, twenty, twenty-four or thirty-six exposure film are spliced together for processing and printing purposes. More recently, high speed automatic photographic printers have been adapted to also operate in a reprint production mode in which short segments of film (typically one to four exposures each) are attached to an elongated paper tab.

Both first-run and reprint production in a photographic printer require a neghold assembly which will automatically clamp the film when a desired negative is at the print station or print gate. In both types of printing, the film has a tendency to curl, and the neghold assembly must be capable of flattening the film when it is at the print gate. This is particularly important with reprint production, since the short film strips are typically older and are held only along one edge. As a result, it is more difficult to flatten the film strips in a reprint production operation than in first-run production printing.

One typical type of prior art neghold assembly uses a lower plate or base and a top clamping plate which is pivotally connected to the base. A bias spring biases the clamping plate downward into a normally closed clamping position. A solenoid mounted on the printer has a plunger which extends upward through the base. When energized, the solenoid drives the plunger upward to pivot the top clamping plate to an open position. While this type of neghold assembly has been generally acceptable for first-run production, difficulties have been encountered when attempting to use it for reprint production printing. In particular, with the prior art neghold assembly, flattening and clamping of the short segments of tabbed film has proved to be difficult, since all of the clamping force is provided by the bias spring.

U.S. Pat. No. 3,073,214 by Haviland shows another type of a solenoid operated neghold assembly. The solenoid when energized draws in a plunger which is attached to a lever that pivots on a hanger. One arm of the lever moves downwardly while the other arm of the lever moves upwardly pushing a link upwardly and moving the frame through a linking member to a clamping position as shown in FIGS. 4 and 5 of the Haviland patent. When the solenoid is deenergized, a spring shown in FIG. 7 of the Haviland patent lifts the plunger from the solenoid and moves the frame into a nonclamping position. The neghold assembly of the Haviland patents, however, is not suitable for today's modern high-speed, efficient photographic printers. The linkage from the solenoid to the frame is extremely complicated and the use of knee lever to release the frame from a clamping position for each individual negative of a film strip is inefficient. In an automatic system, the clamping and releasing of the film negative must be done quickly and automatically, and the complicated linkage in the Haviland patent is not conducive to such quick movements. Further, this type of neghold assembly does not afford a quick changeover from one film size to another since the linkage has to be disconnected from the frame and a different frame corresponding to another film size reconnected to the linkage.

Another neghold assembly is shown in U.S. Pat. No. 4,161,365 by Anderson and Wedel. This neghold assembly has quickly changeable bottom and top clamping plates. However, the particular neghold assembly shown is manually operated.

There is a need for an improved neghold assembly (usable in both first-run and reprint production) that quickly and effectively clamps photographic film negatives during printing and quickly releases the negatives to allow the next frame of the photographic film to advance to the print gate.

SUMMARY OF THE INVENTION

The neghold assembly of the present invention is an automatically operated neghold assembly which effectively flattens and clamps photographic film negatives at a print gate of a photographic printer. The neghold assembly includes a bottom clamping surface, a pivot arm, a top clamping plate fixedly attached to the pivot arm, a solenoid upwardly engaging the pivot arm and a bias spring for upwardly engaging the top clamping plate. The bottom clamping surface and the top clamping plate have apertures that allow light to be transmitted through the photographic film negative onto the photosensitive paper.

The neghold assembly is normally in an open nonclamping state, with the solenoid deenergized. When a film frame is properly positioned in the print gate, the solenoid is energized and upwardly engages the pivot arm at a point on the opposite side of a pivot axis from the attached top clamping plate. The solenoid pivots the top clamping plate about the pivot axis to a clamping position, whereby the top clamping plate and the bottom clamping surface are clamped together with the film negative held securely therebetween. When the solenoid is deenergized, the bias spring pivots the top clamping plate about the pivot axis from a clamping position to an open position. The bias spring has a force slightly greater than the weight of the top clamping plate for biasing the top clamping plate to a normally open position.

DETAILED DESCRIPTION OF THE PREFERRED EMBODIMENTS

Figure 1:
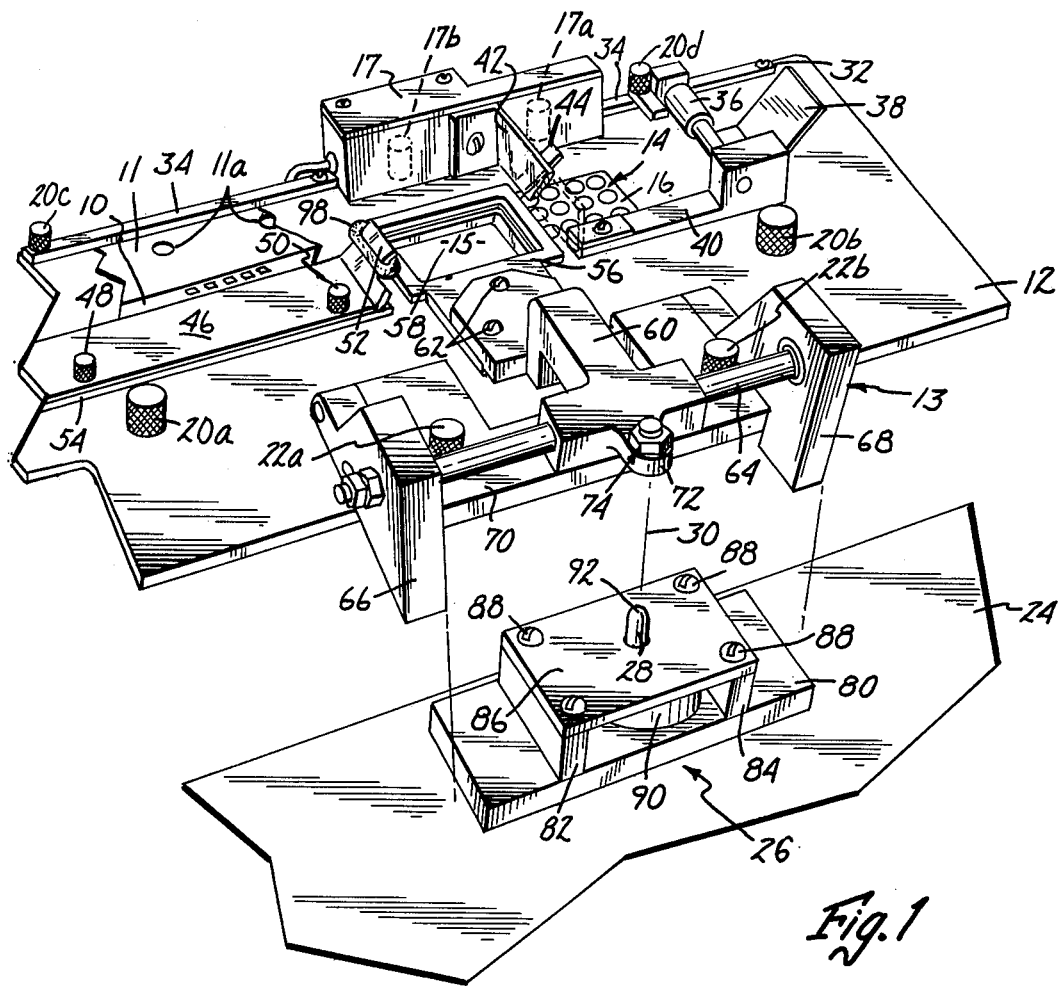
FIG. 1 is an exploded perspective view of the neghold and solenoid of the present invention.
Figure 2:
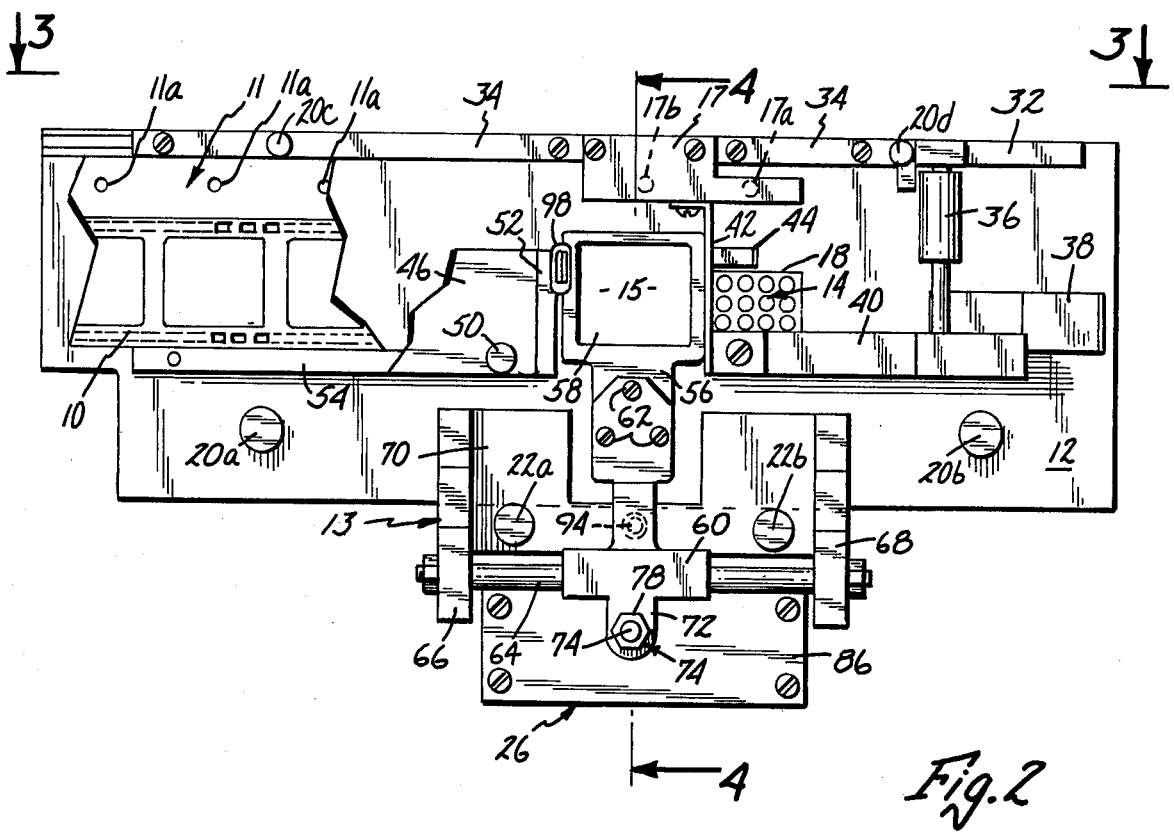
FIG. 2 is a top view of the neghold assembly of the present invention.

A preferred embodiment of the improved neghold assembly of the present invention is shown in a perspective view from the rear of the assembly in FIG. 1, and in a top view in FIG. 2. The specific embodiment shown in the figures is a reprint neghold for use with film segments 10 of about one to four frames each which are attached to an elongated tab 11. The present invention, however, is equally applicable as a first-run neghold in which longer strips of film are attached to one another by splices at their end.

The neghold assembly includes a clamping base 12 and a neghold clamping assembly 13 which is fixedly attached to base 12. In the view shown in FIGS. 1 and 2, film 10 and tab 11 move from right to left as each frame of film 10 is advanced first to an automatic exposure correction (AEC) gate 14 at which density measurements are taken, and then to a print gate 15 at which light is passed through the film frame and imaged onto the photosensitive print paper within the printer.

Figure 3:
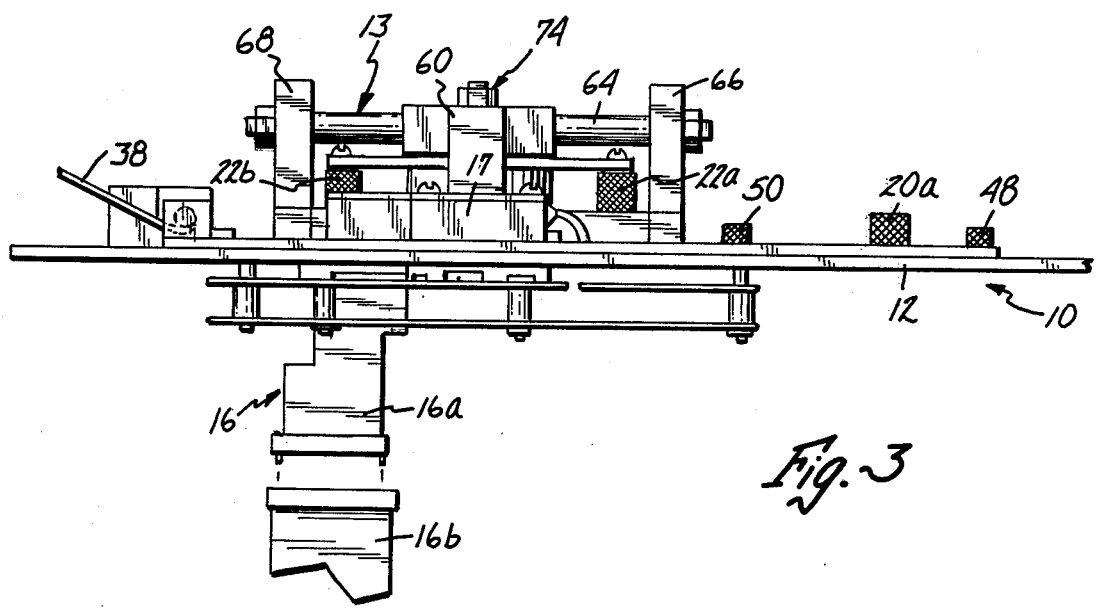
FIG. 3 is a front view taken along the line 3—3 from FIG. 2.

Located at automatic exposure correction gate 14 is a light guiding module 16 which is preferably of the type described in U.S. Pat. No. 4,165,176 by Ronald C. Laska and Wayne R. Pierce, and which is assigned to the same assignee as the present application. Light guiding module 16 (best shown in FIG. 3) is attached to base 12 and includes a plurality of light conducting fiber optic bundles 16a which direct light to an array of photosensors 16b mounted in the printer. Light is directed downward through film 10 and into the light conducting fiber optic bundles 16a of module 16 and finally to the photosensor array 16b. From the signals produced by photosensor array 16b, the printer makes appropriate exposure corrections.

Also shown in FIGS. 1 and 2 is lamp block 17, which contains a pair of light sources 17a and 17b. Light source 17a is aligned with AEC gate 14, while light source 17b is aligned with print gate 15. Paper tab 11 passes under block 17, and the light from light sources 17a and 17b are directed downward to a pair of corresponding photosensors (not shown). In this manner, holes 11a in paper tab 11 are detected. As described in the copending patent application by Janis Pone and Ronald C. Laska, Ser. No. 109,823, filed Jan. 7, 1980, now U.S. Pat. No. 4,264,197, issued Apr. 28, 1981, and entitled "Photographic Reprint System with Dual Indicia Sensor for Synchronization Recovery" which is assigned to the same assignee as the present application, the detection of holes 11a is used to signal when to take automatic exposure correction measurements at AEC gate 14, when to stop the film in print gate 15, and to identify synchronization errors when operating in the reprint production mode.

As shown in FIG. 1, base 12 is a modular assembly which can be removed from the printer and replaced with a similar reprint neghold assembly for a different film size, or a first-run neghold for the same or a different film size. Six thumbscrews 20a, 20b, 20c, 20d, 22a and 22b mount base 12 onto frame 24 of the photographic printer. Solenoid assembly 26 is fixedly attached to photographic printer frame 24 and has a solenoid plunger 28 which drives the neghold clamping assembly. Solenoid plunger 28 engages one end of the neghold clamping assembly as illustrated by broken line 30.

The neghold assembly of the present invention, as illustrated in FIGS. 1 and 2, includes various guides for photographic film segments 10 and tab 11 as they advance through the neghold assembly. Positioned along the front edge of base 12 are longitudinal front guides 32 and 34. Guides 32 and 34 guide the front edge of tab 11 along essentially the entire length of base 12. The advancing tab 11 and film segment 10 pass under roller 36 and deflector 38, respectively. Deflector 38 has an inclined portion which deflects the front edge of each film segment 11 downward onto the top surface of base 12. This is necessary because film segment 10 is attached to tab 11 only along its front side edge, and the leading and trailing edges of film segment 10, as well as the rear side edge of the film segment 10, are free.

Rear guide 40 provides a guiding surface for the rear side edge of film strip 10 as it advances to AEC gate 14 and print gate 15. As film segments 10 are passing over light sensing module 16, tab 11 is passing under lamp block 17 so that the holes 11a in tab 11 can be detected.

At AEC gate 14, light is directed downward from a light source located above the neghold assembly through film 11 and into light sensing module 16. It is important that stray light from AEC gate 14 be prevented from spilling over into print gate 15, since this could result in an incorrect exposure. Light separator 42 is mounted between guide 40 and lamp block 17 and provides a barrier against light passing from the AEC gate 14 to the print gate 15, or vice versa. Deflector 44 is positioned on the upstream side of separator 42 proximate lamp block 17 and guides the edges of film segments 10 under separator 42 and into print gate 15.

Guide 46 is positioned on the opposite side of print gate. Guide 46 is attached to clamping base 12 by thumbscrews 48 and 50, and is positioned essentially parallel to the top surface of base 12. Guide 46 has a width which is essentially equal to the width of the film 10, and holds the film flat as it is advanced across the remaining portion of the neghold assembly. Guide 46 has a front deflecting portion 52 which guides the film downward between the top surface of plate 12 and the lower surface of guide 46. Rear film guide 54 underlies the rear edge of guide 46 and acts as a guide for the rear side edge of film segments 10.

Figure 4:
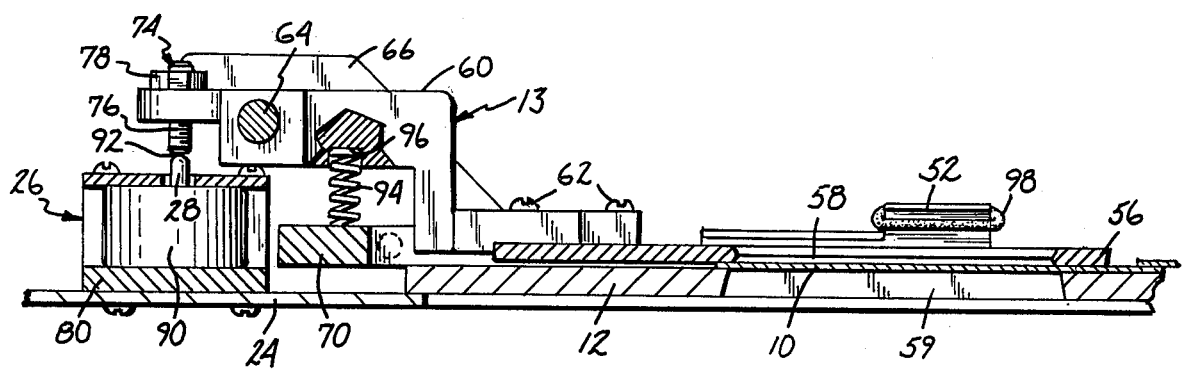
FIG. 4 is a cross-sectional view with some portions shown in their entirety for clarity, taken along the line 4—4 in FIG. 4.

Neghold clamp assembly 13 includes a top clamping plate 56 with a light transmitting aperture 58. The light transmitting aperture 58 is aligned with a light transmitting aperture 59 in the base 12 when the top clamping plate 56 is in a clamping position as best seen in FIG. 4. During printing, a frame of segment film 10 is clamped between base 12 and top clamping plate 56. The top clamping plate 56 is rigidly attached to pivot arm 60 preferably by screw threaded fasteners 62. The pivot arm 60 is fixedly attached to pivot shaft 64, which is pivotally held between right support 66 and left support 68. The pivot arm 60 and pivot shaft 64 pivot together about the axis of pivot shaft 64. Right and left supports 66 and 68 are fixedly attached to base 12 and are in turn fixedly attached to each other by connecting member 70.

Pivot arm 60 also includes a solenoid engaging portion 72 with an adjustment device 74 as best seen in FIG. 4. Adjustment device 74 preferably includes a screw threaded bar 76 engaging a screw threaded aperture (not shown) with nut 78 engaging screw threaded bar 76 atop solenoid engaging portion 72. Nut 78 securely holds screw threaded bar 76 at any position to which the screw threaded bar 76 is adjusted.

Solenoid assembly 26 is permanently attached to frame 24 of the photographic printer, as shown in FIG. 1. Solenoid assembly 26 preferably includes base 80, upright members 82 and 84, top plate 86, fasteners 88 and solenoid 90. Base 80 is permanently attached to frame 24 of the printer, and upright members 82 and 84 are fixedly attached to base 80. Top plate 86 is mounted on top of upright members 82 and 84 by screw threaded fasteners 88. Solenoid 90 is positioned within the mount formed by base 80, upright members 82 and 84 and solenoid 90. Plunger 28 of solenoid 90 protrudes through aperture in top plate 86 and contacts threaded bar 76 at contact point 92 when the solenoid 90 is energized (as best seen in FIG. 4).

Bias spring 94 (which as shown is preferably a compression coil spring) is positioned between connecting member 70 and pivot arm 60 on the opposite side of pivot shaft 64 from solenoid engaging portion 72. Bias spring 94 is in a substantially upright position and is secured within recess 96 of pivot arm 60. Bias spring 94 is in a compressive state when plunger 28 of solenoid 90 engages threaded bar 76 at contact point 92. When the solenoid is deenergized, bias spring 94 has sufficient force to pivot pivot arm 60 upwardly, thereby lifting top clamping plate 56 from a clamping position and releasing photographic film 10.

Upward stop 98, preferably an O-ring, is secured around upwardly extending portion 52 of guide 46. Upward stop 98 partially extends over top clamping plate 56 and stops the upward movement of top clamping plate 56 when the solenoid 90 is deenergized and bias spring 94 forces pivot arm 60 upwardly. Upward stop 98 is preferably made of a resilient material, such as rubber, to avoid damaging the top clamping plate.

In operation, photographic film segments 10 and paper tab 11 are advanced across the neghold by a drive system (not shown) of the printer which engages paper tab 11. The various guides described previously permit advancement of tab 11 and film segments 10 and prevent jamming caused by the free edges of film segments 10.

In the normal state, solenoid 90 is deenergized and top clamping plate 56 is biased to an upward position by bias spring 94. In this position, film segments 10 and tab 11 can be advanced without interference from top clamping plate 56. As each film frame to be printed passes the automatic exposure correction gate 14, the frame location hole 11a in tab 11 adjacent that frame is detected, and automatic exposure correction sensor readings are taken. The film frame is advanced into print gate 15, and is stopped in response to the sensing of frame location hole 11a by light source 17b and its accompanying sensor. When the film frame is stopped in the print gate, solenoid 90 is energized, thereby driving plunger 28 upward. The force supplied by plunger 28 drives threaded bar 76 upward, thereby pivoting the pivot arm about pivot shaft 64 and bringing top clamping plate 56 down onto the film frame.

After a print exposure cycle has been completed, solenoid 90 is deenergized, and bias spring 94 causes pivot arm 60 to pivot so that top clamping plate 56 moves upward. The upward motion of top clamping plate 56 is limited by upper stop 98. A film advancement cycle again occurs, thereby advancing the next film frame to be printed into print gate 15. Solenoid 90 is again energized, thereby bringing top clamping plate 56 into its clamping position.

An important improvement of the present invention is that it provides a maximum clamping force to securely clamp and flatten film 10. The maximum clamping force is achieved when solenoid 90 is in its full energization state, since the force supplied by solenoid 90 increases as it is energized. In the present invention, bias spring 94 need only have sufficient force to lift top clamping plate 56 when solenoid 90 is deenergized. In other words, the spring force of bias spring 94 does not have to overcome the force of solenoid 90. Similarly, solenoid 90 has to overcome only a relatively small spring bias force during clamping.

The present invention is in contrast to the previously discussed prior art type of neghold assembly, in which the top clamping plate is normally biased in its clamping position by a bias spring, and a solenoid is used to pivot the top clamping plate to an open position. In this prior art type of neghold assembly, a much larger spring force must be used, since it is the force of the spring which provides the clamping action. In the present invention, on the other hand, it is the force of the solenoid which provides the clamping power. As a result, the requirements for the spring bias are greatly reduced.

In conclusion, the neghold assembly of the present invention is an important improvement over the prior art neghold assemblies. It provides secure clamping of film in either a first-run or a reprint mode of operation. The neghold assembly of the present invention maximizes clamping power by using the solenoid to drive the clamping plate downward into clamping position, and minimizes the bias spring requirements.

Although the present invention has been described with reference to preferred embodiments, workers skilled in the art will recognize that changes can be made in form and detail without departing from the spirit and scope of the invention.

What is claimed is:

1. A neghold assembly for use in a photographic printer comprising:
   a base having a first light transmitting portion;
   pivot means attached to the base for pivoting about a pivot axis and including an adjustment device;
   a top clamping plate fixedly attached to the pivot means on a first side of the pivot axis, the top clamping plate having a second light transmitting portion for alignment with the first light transmitting portion when the top clamping plate is in a clamping position;
   solenoid means having a movable plunger for upwardly engaging the adjustment device with increasing energization on a second, opposite side of the pivot axis pivoting the top clamping plate about the pivot axis into the clamping position against the bottom clamping surface when the solenoid means is energized wherein the adjustment device provides adjustment of the clamping force applied by the top clamping plate when the solenoid means is in a full energization state; and
   bias spring means for pivoting the top clamping plate about the pivot axis from the clamping position to an open position when the solenoid means is deneergized.

2. The neghold assembly of claim 1 wherein the pivot means comprises:
   a pair of substantially vertical members fixedly attached to the base;

a pivot shaft extending between and pivotally connected to the pair of substantially vertical members; and pivot arm means fixedly attached to the pivot shaft, the pivot arm means being fixedly attached to the top clamping plate at a first end and having a solenoid engaging portion on a second, opposite end.

3. The neghold assembly of claim 2 wherein the solenoid means is attached to the photographic printer, and wherein the base is removable from the photographic printer.

4. The neghold assembly of claim 1 wherein the bias spring means is a compression type spring with sufficient force to bias the top clamping plate to an open position when the solenoid means is deenergized.

5. The neghold assembly of claim 4 wherein the bias spring means engages the pivot means at a position between the top clamping plate and the pivot axis.

6. The neghold assembly of claim 5 wherein the bias spring means applies an upward bias force to the pivot means.

7. The neghold assembly of claim 1 wherein the adjusting device is a screw threaded rod threadably engaging a threaded aperture in the pivot means.

8. The neghold assembly of claim 1 and further comprising:

upward stop means for limiting upward movement of the top clamping plate when the solenoid means is deenergized.

9. The neghold assembly of claim 8 wherein the upward stop means engages the top clamping plate when the top clamping plate reaches a predetermined upward limit position.

10. A removable neghold module for mounting on a photographic printer having a solenoid means fixedly attached thereto, the solenoid means having a movable plunger that moves upwardly with increasing energization of the solenoid means, the module comprising:

a base detachable from the photographic printer and having a first light transmitting portion;

pivot means for pivoting about a pivot axis including:
 a pair of substantially vertical members fixedly attached to the base;
 a substantially horizontal pivot shaft extending between the pair of substantially vertical members defining the pivot axis; and
 pivot arm means mounted on the pivot shaft and pivotable about the pivot axis, the pivot arm means having a first clamping end and a solenoid engaging portion on a second, opposite end;

a top clamping plate fixedly attached to the pivot arm means on the first clamping end, the top clamping plate having a second light transmitting portion for alignment with the first light transmitting portion when the top clamping plate is in a clamping position, wherein the solenoid means upwardly engages the pivot arm means proximate the second end, pivoting the top clamping plate downward about the pivot axis into the clamping position against the bottom clamping surface when the solenoid means is energized; and a compression type spring for applying an upward bias force to the pivot means at a position between the top clamping plate and the pivot axis, the upward bias force being sufficient to bias the top clamping plate about the pivot axis from the clamping position to an open position when the solenoid means is deenergized.

* * * * *